Sept. 8, 1931.  A. ANDERSEN  1,822,386
AIRCRAFT
Filed Nov. 14, 1930   6 Sheets-Sheet 1

INVENTOR
*Alex Andersen*
BY *F. P. Lorin*
ATTORNEY

Sept. 8, 1931.　　　　A. ANDERSEN　　　1,822,386
AIRCRAFT
Filed Nov. 14, 1930　　6 Sheets-Sheet 2

INVENTOR
Alex Andersen
BY F. P. Gavin
ATTORNEY

Sept. 8, 1931.    A. ANDERSEN    1,822,386
AIRCRAFT
Filed Nov. 14, 1930    6 Sheets-Sheet 3

INVENTOR
*Alex Andersen*
BY *F. P. Gorin*
ATTORNEY

Sept. 8, 1931.   A ANDERSEN   1,822,386
AIRCRAFT
Filed Nov. 14, 1930   6 Sheets-Sheet 4

INVENTOR
*Alex Andersen*
BY *F. P. Gorin*
ATTORNEY

Sept. 8, 1931.  A. ANDERSEN  1,822,386
AIRCRAFT
Filed Nov. 14, 1930    6 Sheets-Sheet 5

INVENTOR
Alex Andersen
BY *F. P. Gorin*
ATTORNEY

Patented Sept. 8, 1931

1,822,386

UNITED STATES PATENT OFFICE

ALEX ANDERSEN, OF SEATTLE, WASHINGTON, ASSIGNOR OF ONE-HALF TO GEORGE MATHESEN, OF SEATTLE, WASHINGTON

AIRCRAFT

Application filed November 14, 1930. Serial No. 495,716.

This invention relates to the improvement in heavier than air machines, and more particularly in the helicopter type.

The helicopter possesses many distinct advantages over other aircraft in that it is able to rise straight up and go straight down without gliding, and is more easily maneuvered than other forms of aircraft, while it is more easily stabilized and can be practically suspended or held stationary at any desired place in the air. While traveling in a vertical line, my machine can be turned on its own axis so as to face any direction, and may be also tilted to travel at an incline if desired, while in flight it can be controlled or glided as any other form of airplane. The speed of the machine ranges from the slightest motion forward to full speed. After having ascended preparatory to continuous flight, the control used mostly in ascending can be locked to that of continuous flight and be taken care of at the same place.

I accomplish the above and other objects by the peculiar arrangement and combination of the parts, as will be more fully explained in the following specification, shown in the accompanying drawings, and finally pointed out in the appended claims.

Figure 1:
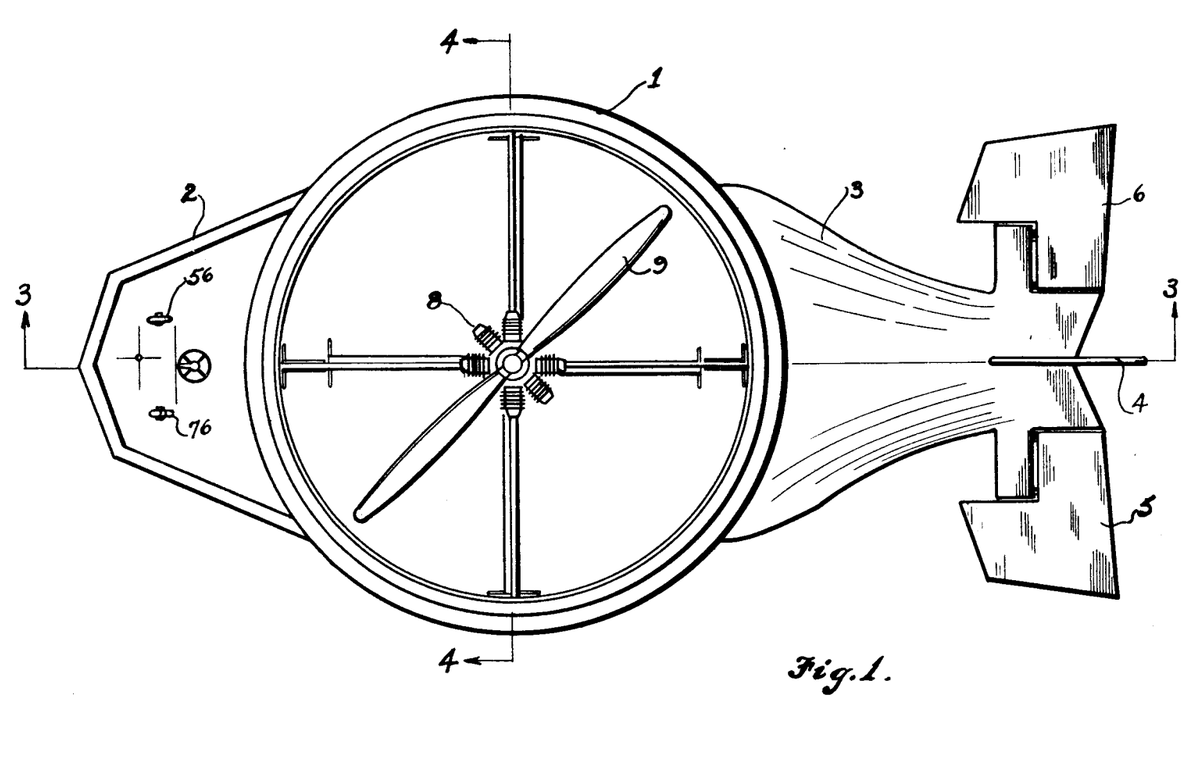
Figure 1 is a plan view of my device.
Figures 9, 10:
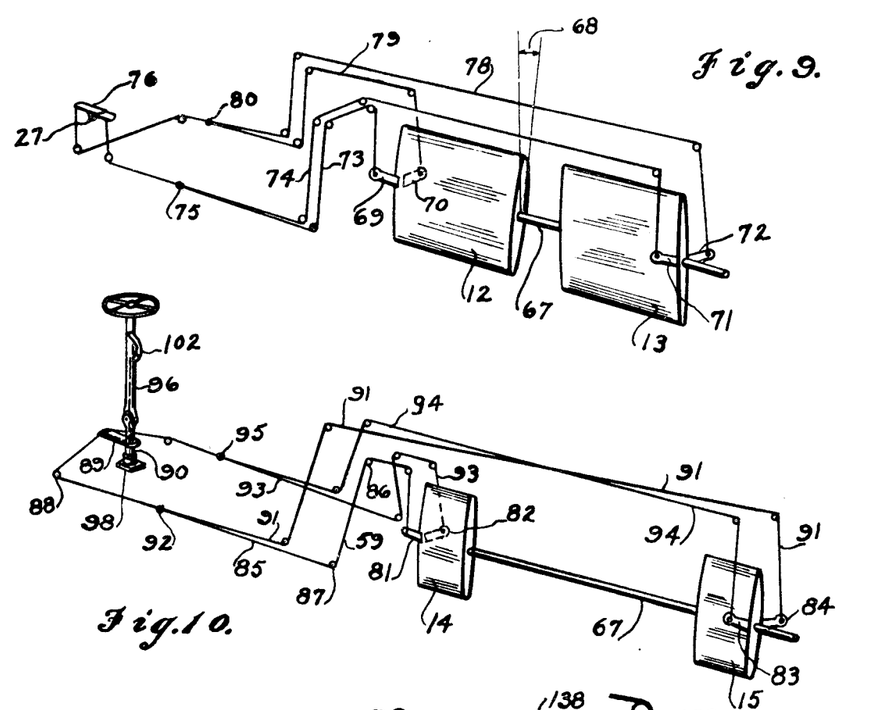
Figure 9 is a perspective similar to 7, but of sidewise stabilizing.
Figure 10 is a perspective of the hook up for vanes for turning helicopter about its vertical axis.

Referring now more particularly to the drawings, reference numeral 1 indicates the body proper of the machine. 2 indicates the forward cockpit in which are located the controls which may be used for passenger service. 3 is the after part or tail to which are connected the rudder 4 and the elevators 5 and 6. 7 is a vertical cylinder suspended in the framework by means of which the lateral motion is accomplished. Any point of this cylinder may be raised or lowered and the corresponding point diagonally opposite moves in the opposite direction, that is, if the rear of the cylinder is raised, the front part will be correspondingly lowered (see dotted lines in Figure 2). This motion can also be accomplished sidewise or at any other angle across the machine. 8 indicates the motor connected directly to an elevating propeller 9 (see Figures 1, 3 and 4). 10 and 11 represent diagonal vanes which can be used in balancing the machine in a fore and aft direction and also assist in its motion forward (see Figures 4 and 7). 12 and 13 are a similar set of vanes to assist in balancing the machine sidewise (Figures 3 and 9). 14 and 15 are a set of vanes which can be used in turning a machine on its vertical axis (Figures 3 and 10).

Figure 3:
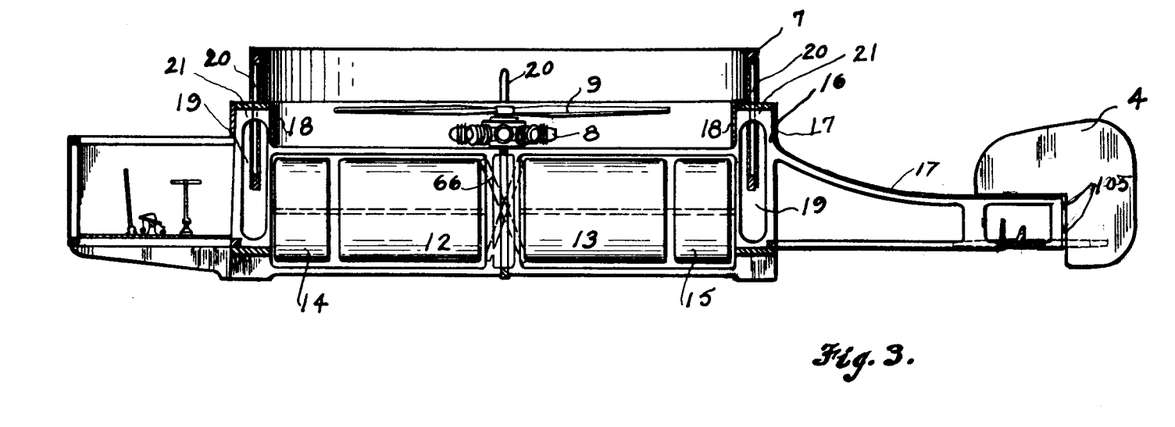
Figure 3 is a section taken upon the line 3—3 of Figure 1.
Figure 4:
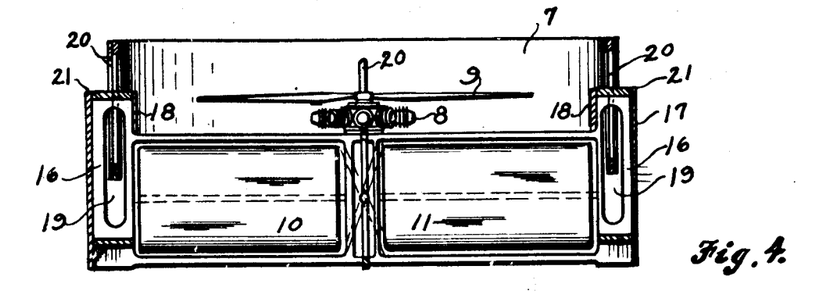
Figure 4 is a section taken upon the line 4—4 of Figure 1.

Going more into detail and construction and hook up of the machine, reference numeral 16 indicates the frame proper of the machine on which is placed a fabric or light metal covering 17. In the case of an all metal machine, the general shape of this main body is that of a vertical cylinder (see reference numeral 1 in plan view Figure 1). The inside of this cylinder is also provided with a similar covering 18 on the inside, as shown in Figures 3 and 4. This really makes a double wall cylinder with a space 19 between into which fits the flight cylinder 7. The cylinder 7, of course, is provided with narrow slots 20 which fit over the bridges 21 connecting the inner and outer walls of cylindrical body 1. Cylinder 7 is used to aid in motion forward, which is accomplished in the following manner:—

The rear part of the cylinder is raised, the front part being correspondingly lowered, as indicated by dotted lines 22. The method of raising and lowering will be more readily understood by referring to Figure 5. The dash line 7 indicates the cylinder. Near the lower end of the cylinder 7, at the front and rear, are four lugs or brackets 23, 24, 25 and 26, to which controlling cables are fastened. To the front lug 23 is a cable 27 passing around the sheave 28 and fastened on the rear side of control stick 29, as shown at 30, and from the same lug 23 is another cable 31 passing upward over sheave 32, 33, 34, 35 and 36, then downward to lug 25.

Figure 5:
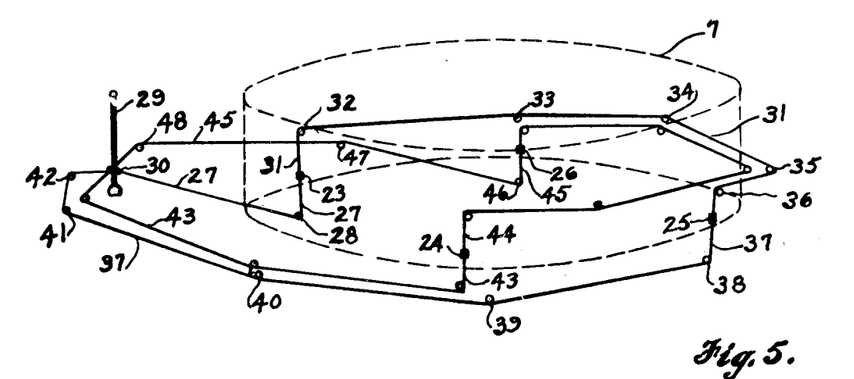
Figure 5 is a perspective of the speed control hook up.

Downward from lug 25 passes another cable 37 around sheaves 38, 39, 40, 41 and 42, then to the front side of control 29. Downward from lug 24 passes a cable 43 around sheaves and finally connects to the left side of control stick 29. Upward from lug 24 passes a cable 44 passing around sheaves till it gets to the opposite side of the cylinder, thence downward where it connects with lug 26. Downward from lug 26 passes a cable 45 around sheaves 46, 47 and 48, thence to the right side of control stick 29. From this it will be seen that as the control stick 29 is moved forward, the front edge of the cylinder will be lowered by the pulling of cable 27. The lowering of the front edge will cause the back edge to raise through the cable 31. The rearward motion of control stick 29 will have the opposite effect on cylinder 7. In a similar manner, any sidewise motion of control stick 29 will cause the raising or lowering of the right or left side of the cylinder 7. By moving control stick 29 in any other direction excepting straight forward or back or directly to the right or left can cause any other point of cylinder 7 to be raised or lowered by the combination of the front and back or side wise motions. The operation of cylinder 7 can be transferred from control stick 29 to that of the steering column and be operated in conjunction with the elevators 5 and 6. More detail of this control stick and method of transferring the motion to the steering column will be more fully described later in connection with the elevators.

Figure 2:
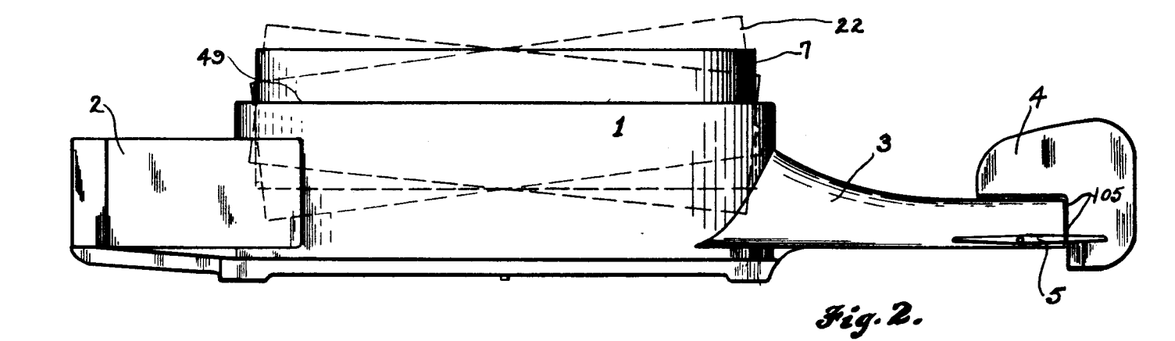
Figure 2 is a side elevation.

The propeller 9 rotating will tend to create a partial vacuum above it, and owing to the cylinder 7 being tilted, as indicated, the vacuum to the rear of the inside of the cylinder will be a little higher or greater than on the fore side, as on the fore side air more readily rushes in over the top, as indicated by arrow 49 (Figure 2). The vacuum at the rear of the cylinder being greater than the front, will naturally tend to pull the machine forward. By arranging the cylinder so one side will be higher than that of the other, it will readily be seen that the draft sidewise of the machine, due to side winds, can be taken care of.

Figure 7:
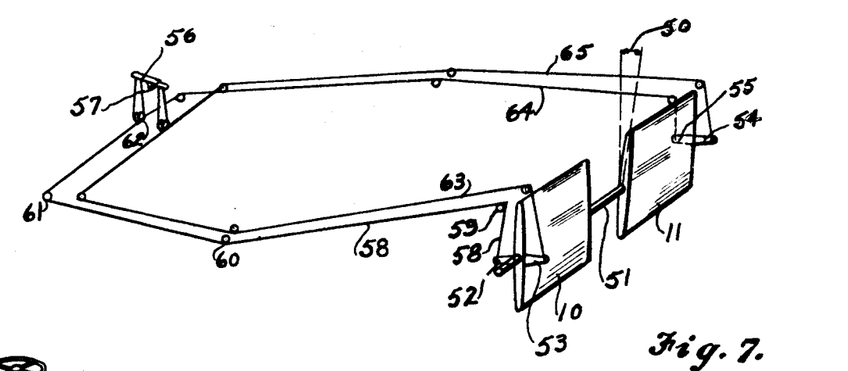
Figure 7 is a perspective of the hook up of a counteracting and fore and aft stabilizing vanes.

Referring to vanes 10 and 11 (Figure 7), it will be noticed that vane 11 is set at an angle to that of vane 10, as indicated by arrow 50. The reason for this is that as the machine is lifting upward, the angularity of the vanes with respect to each other will tend to cause a rotating motion of the machine which is in opposite direction to the rotating motion that the rotation of the propeller will tend to give it. The vanes 10 and 11 are mounted on the shaft 51 running crosswise on the machine. 52, 53, 54 and 55 are levers mounted at right angles to the vanes, as shown in Figure 7. 56 is a foot pedal pivoted at 57 in the machine (see Figure 1 also for pedal 56). A cable 58 passes from lever 52 over sheaves 59, 60, 61 and 62, thence up to front part of foot pedal 56. 63 is another cable passing from lever 53 to the rear of foot pedal 56. 64 is a cable passing from lever 55 to the front of foot pedal 56. 65 is a similar cable passing from lever 54 to the rear of foot pedal 56, as clearly indicated in Figure 7.

From this it will be seen that as the foot pedal is depressed one way or the other that the vanes 10 and 11 will be rotated simultaneously in the same direction and through a light arc of rotation. If the top of vanes 10 and 11 are given a rotation forward, as indicated by dotted lines 66 (Figure 3), and the machine is moving upward, it will be seen that the vanes 10 and 11 will have a tendency to move it forward at the same time.

Referring to Figure 9, vanes 12 and 13 are mounted on a shaft 67 running lengthwise of the machine, vane 12 is set at an angle 68 with respect to vane 13 for the same purpose as the angle 50 for vanes 10 and 11 (see Figure 7), as has been previously described. Vanes 12 and 13 are provided with levers 69, 70, 71 and 72. The cables 73 and 74 running from levers 69 and 71 respectively are joined at a common point 75, thence to the rear of the foot pedal 76 which is pivoted at 77 in the machine (see Figure 1 for location of foot pedal 76 in machine). 78 and 79 are two other cables running from levers 70 and 72, then connected at a common point 80 and thence passing to the front of foot pedal 76. From this it will be seen that vanes 12 and 13 rotate simultaneously a like distance and in the same direction upon the depression of foot pedal 76 one way or the other. Vanes 12 and 13 serve the same purpose as vanes 10 and 11 of Figure 7, but at right angles to them.

Referring to Figure 10, 14 and 15 are two other small vanes mounted on the outer ends of shaft 67 (see also Figure 3 for location in machine). Vanes 14 and 15 are provided with levers 81, 82, 83 and 84, as shown. 85 is a cable passing from lever 81 over sheaves 86, 87 and 88 to lever 89 which is connected to the lower section 90 of the steering column. The connection of cable 85 to lever 89 and the steering column will be described more in detail presently. A cable 91 passes from lever 84, crosses over and passes the same side as cable 85 to which it connects at point 92. 93 is a cable passing from lever 82 over proper sheave and finally to lever 89. 94 is a cable passing from lever 83 over to the opposite side and finally connects the cable 93 at point 95. The connections of cables 83 and 93 to lever 89 and description of the steering column will now be taken up.

Figures 12, 14:
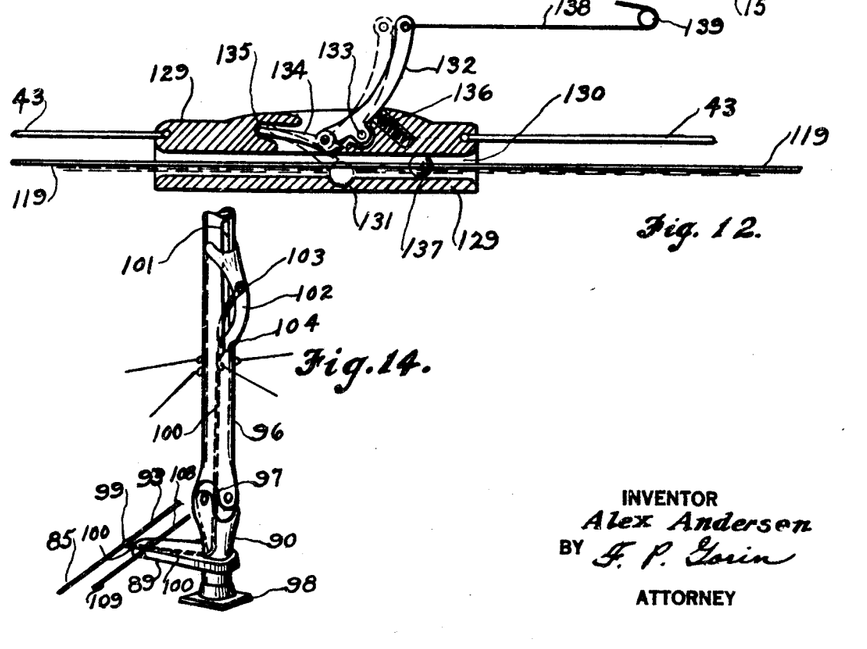
Figure 12 is a cross section of the locking device used in Figure 11.
Figure 14 is a perspective of steering column with device for connecting and disconnecting vanes shown in Figure 10 with steering column.

The steering column is composed of two hollow members 90 and 96 (see Figure 14) connected by a universal joint 97, which is hollow through the center. The lower end 90 of the steering column is rotatively mounted in a base 98 of the machine. Cables 85 and 93 are connected at a common point 99, from which passes a cable 100 in through lever 89 which is hollow, up through section 90, through universal joint 97 up through hollow member 96, through a slot 101 and connects with a slide 102 at point 103. Slide 102 is provided with a hook 104 at its lower end. When the slide 102 is in its raised position, the hook 104 being hooked over the lower end of the slot 101, as shown in Figure 14, the cable 100 will be pulled up tight so the junction 99 of the cables 85 and 93 will be held up snugly against the end of the lever 89. When the hook 104 is lifted out of slot 101, the slide 102 can be lowered. In this lowered position, the cable 100 will have considerable slack and the steering column 90 and 96 may be rotated without effecting any movement of the cables 85 and 93, thus permitting the steering column to be rotated without causing any movement of the vanes 14 and 15. The mounting of the rudder and its control will now be taken up.

Figure 6:
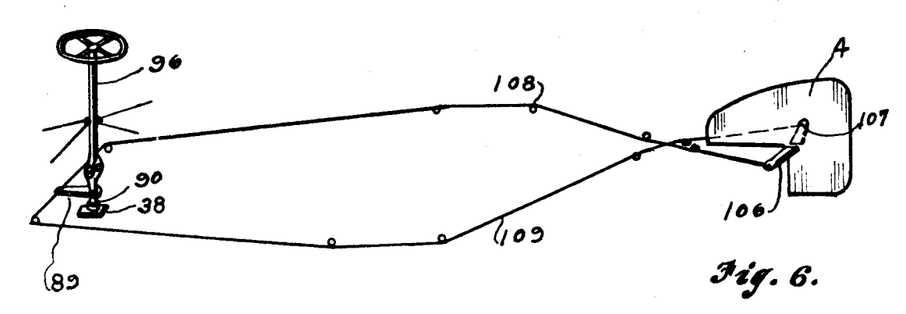
Figure 6 is a perspective of the rudder hook up.

Referring to Figures 2, 3 and 6, reference numeral 4 is the rudder mounted to the rear of the machine by hinges 105. 106 and 107 are two levers secured at right angles to the rudder. 108 and 109 are cables passing from 106 and 107 respectively to the lever 89 of the steering column (see Figure 14). From this it will be seen that as the steering wheel is turned to the right or left, the machine will be turned in a like direction. The hook up of the elevators will now be taken up.

Figures 8, 13:
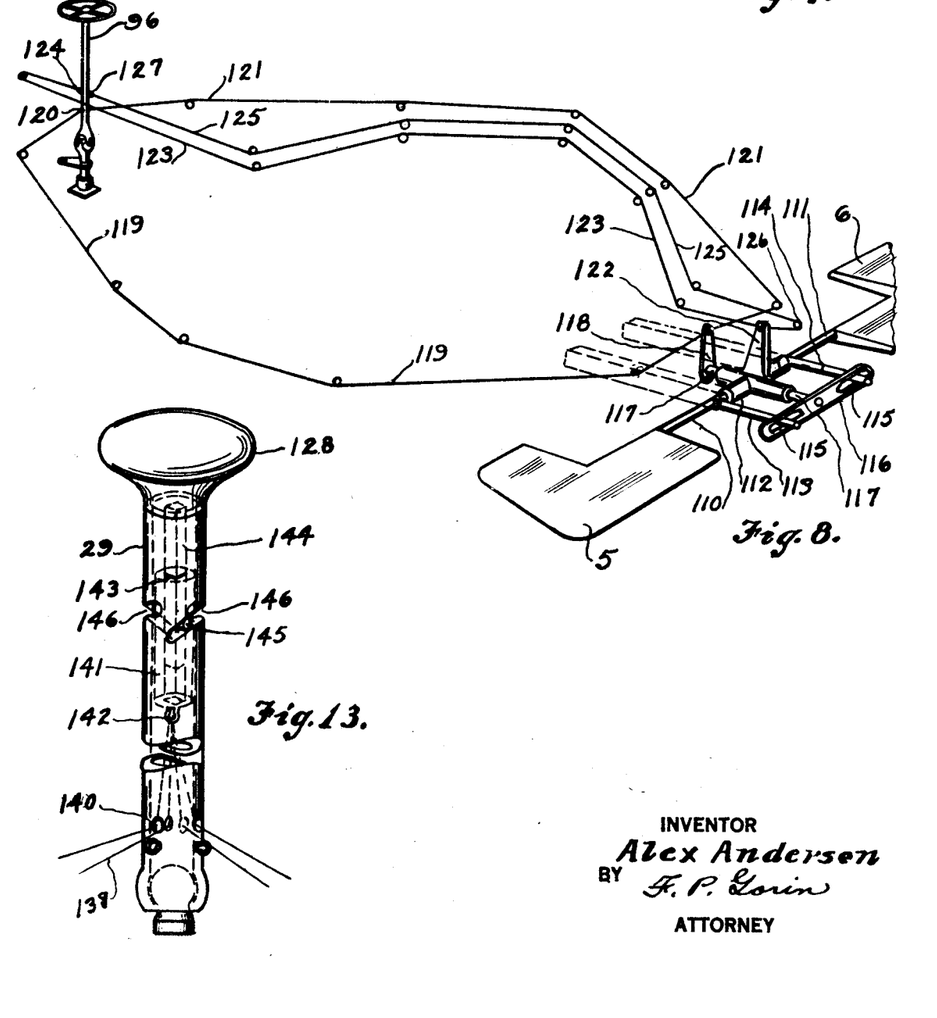
Figure 8 is a hook up of elevator vanes.
Figure 13 is a perspective of control stick with device for locking controls together.

Referring to Figure 8, reference numerals 5 and 6 are the two elevators mounted on shafts 110 and 111 which pass into the opposite side of a casting 112. Passing back from shaft 110 is a lever 113. 114 is a like lever passing back from 111. These levers pass through slots 115 of a lever 116 which is rigidly secured to a shaft 117 passing through the casting 112. To the front end of shaft 117 is secured a crank 118. To the left of crank 118 passes a cable 119 which passes to the front of the machine and attaches to the left of the steering column 96 at 120. 121 is another cable attached to crank 118 and passes to the right, then to the right of the machine, and connects to the right side of steering column 96. 122 is a bracket which is part of the casting 112. To this bracket 122 is attached a cable 123 which passes to the front of the machine and attaches the steering column 96 to the front side, as at 124. 125 is another cable connecting to bracket 122 and passes back over a sheave 126, then to the front of the machine, and to the back of steering column 96, as at 127.

Examination of Figure 8 will show that as the steering column 96 is moved forward or backward, the bracket 122 will be moved forward or backward in a like manner, rotating a casting 112, from which it will be seen that the lever 116 will be moved up or down, rotating elevators 5 and 6. The movement of elevators 5 and 6 will be in the same direction, and a like distance. This movement is used in climbing or descending when the machine is moving in a straight line. By moving the steering column to the right or left, it will be seen that crank 118 will be turned, rotating the shaft 117, which in turn rotates lever 116 about its center; this causes levers 113 and 114 to rotate in opposite directions, which naturally causes elevators 5 and 6 to turn in opposite directions. This movement is used in banking the machine when turning from its course. By combination of a fore and aft motion and a sidewise movement, the machine may be made to climb or descend and turn at the same time.

For continuous flight and ease of control, the operation of the cylinder can be transferred from the control stick 29 to that of steering column 96 by the turning of a small knob 128 located at the top of control stick 29 and which operates a special operating device which is shown in Figure 12. The operation of this will now be described.

Referring to Figure 12, reference numeral 129 is a casting bored through lengthwise, as at 130. Near the center of this bore and on its lower side is a pocket 131. 132 is a lever pivoted to the casting 129 at 133. To the lower end of lever 132 is pivoted a small lever 134, the left hand end of which fits into a pocket or recess 135. At 136 is a spring fitting into a hole in casting 129, which tends to move the lever 132 forward, as indicated by the dotted line. When the lever 132 is in the dotted position, it will be seen that the right hand end of 132 is forced downward, as shown in the dotted position. One of these locks, as shown in Figure 12, is slipped over each of the cables 119, 121, 123 and 125, passing from the steering column 96, (see Figure 11).

Figure 11:
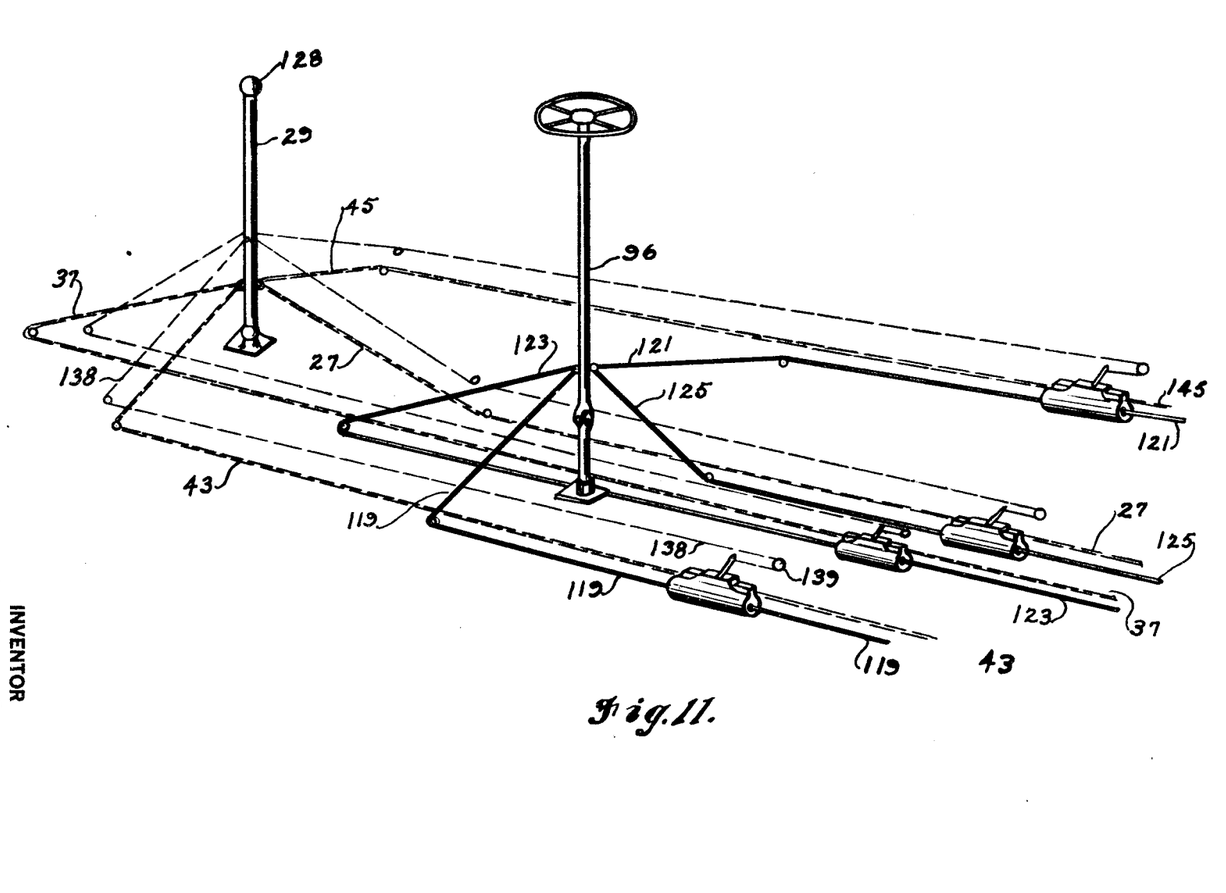
Figure 11 is a perspective showing arrangement for locking two sets of controls together as one unit.

Referring to Figure 11, reference numeral 29 represents a control stick, and 27, 37, 43 and 45 are the cables passing from it and which connect the cylinder 7, as has been previously described. The method of locking any two cables together, such as cable 119, for steering column 96 and cable 43 from control stick 29 will now be more fully gone into.

A description of the method of locking cable 119 and 43 will plainly show that the same applies to any of the other three pairs of cables. Referring back to Figure 12, cable 119 is provided with a ball 137 which is securely fastened to it. Cable 43 is secured to the casting 29, as shown. When it is desired to lock the cable 43 and 119 together, the lever 132 is released and allowed to take its dotted position, (the spring 136 forcing it over this way) and the lever 134 will also be in its dotted position. When the two cables 43 and 119 are brought into the proper relation, the ball 137 will be lodged in the pocket 131 and secured there by lever 134 until lever 132 has been released. Lever 132 can be released by pulling on the wire 138. This wire 138 passes back over a sheave 139 (see also Figure 11), up to the control stick 29. The pulling and releasing of wire 138 can be best understood by referring to Figure 13. The wire 138 passes through a hole 140 in control stick 29, up to a sliding cylinder 141, to which it is securely attached at eye 142. Sliding cylinder 141 is provided with a square hole 143 into which loosely fits a square bar 144, which is secured to the knob 128. Sliding cylinder 141 is provided with a pin 145 which slides into helical groove 146 in control stick 29.

From the above, it will be seen that as knob 128 is turned, the bar 144 will turn with it, turning the cylinder 141 which will be moved up or down, due to pins 145 working into grooves 146. By turning knob 128 clockwise, the sliding cylinder 141 will be lowered, releasing the tension in wire 138 which will release the wire 132 shown in Figure 12, consequently locking the two cables 43 and 119 together. By turning knob 128 in a counterclockwise direction, the lever 132 will be again brought back in position shown in solid lines, releasing the ball 137 from pocket 131, thus allowing cable 142 and 119 to operate independent of each other. The main purpose of the body is to eliminate the downwash. Downwash occurs when one vertical propeller is operated, the air having a tendency then to move in a circle around the propeller to the ground.

By this arrangement of the main body of the machine, the downwash will practically be eliminated. Then it is clear that there are two extra lifting forces at work, which are as follows:—

1. One of the extra lifting forces of the propeller being due to the elimination of downwash.

2. The other force is that there is vacuum above the machine, and that the machine must have a tendency to lift itself against this vacuum independently of the lifting force of the propeller.

I claim:—

1. An aeroplane of the helicopter type comprising a body including a circular portion, a propeller operating in a horizontal plane within the circular portion, and an annular member concentric with the propeller and adjustable to vary the influence of the propeller on the air within said member.

2. An aeroplane of the helicopter type comprising a body including a circular section, a propeller operative in a horizontal plane with respect to the body and within said circular section, an air directing cylinder concentric with the propeller and mounted for adjustment relative to the circular section on substantially any diametric line as an axis, and manually operable means for controlling the adjustment of the cylinder.

3. An aeroplane of the helicopter type comprising a body including a circular section open at the top and bottom, a propeller operative within the section, an air directing cylinder concentric with the propeller and mounted for movement relative to the section, manually operable means for adjusting the cylinder on substantially any diametric line as an axis, said means including a plurality of cables, and a control stick to which the cables are connected.

4. An aeroplane of the helicopter type comprising a body including a circular section, a propeller operative within the section, a universally adjustable cylinder mounted with respect to the section and arranged concentric with the propeller, and fore and aft balancing vanes arranged in the section below the propeller.

5. An aeroplane of the helicopter type comprising a body including a circular section, a propeller operative within the section, a universally adjustable cylinder mounted with respect to the section and arranged concentric with the propeller, fore and aft balancing vanes arranged in the section below the propeller, said vanes being permanently set at an angle with respect to each other, and means for simultaneously adjusting the vanes.

6. An aeroplane of the helicopter type comprising a body including a circular section, a propeller operative within the section, a universally adjustable cylinder mounted with respect to the section and arranged concentric with the propeller, and transverse balancing vanes arranged in the section below the propeller.

7. An aeroplane of the helicopter type comprising a body including a circular section, a propeller operative within the section, a universally adjustable cylinder mounted with respect to the section and arranged concentric with the propeller, and transverse balancing vanes arranged in the section below the propeller, said vanes being permanently set at an angle with respect to each other, and means for simultaneously adjusting the vanes.

8. In an aeroplane of the helicopter type, a body including a circular section, a propeller operative within the section, an air directing cylinder concentric with the propeller and mounted for adjustment on substantially any diametric line as an axis, fore and aft balancing vanes arranged in the section below the propeller, transverse balancing vanes arranged in the section below the propeller, and vanes arranged in line with the transverse balancing vanes and operable to turn the machine on a vertical axis.

9. In an aeroplane of the helicopter type, a body including a circular section, a propeller operative within the section, an air directing cylinder concentric with the propeller and mounted for adjustment on substantially any diametric line as an axis, fore and aft balancing vanes arranged in the section below the propeller, transverse balancing vanes arranged in the section below the propeller, vanes arranged in line with the transverse balancing vanes and operable to turn the machine on a vertical axis, a steering column, and means whereby the last named vanes may be controlled from the steering column.

10. In an aeroplane of the helicopter type, a body including a circular section, a propeller operative within the section, an air directing cylinder concentric with the propeller and mounted for adjustment on substantially any diametric line as an axis, fore and aft balancing vanes arranged in the section below the propeller, transverse balancing vanes arranged in the section below the propeller, vanes arranged in line with the transverse balancing vanes and operable to turn the machine on a vertical axis, a steering column, and means whereby the last named vanes may be controlled from the steering column, said means including an element disconnectible at will from the steering column to render the control of said last named vanes selective at will.

11. An aeroplane of the helicopter type involving a circular body section, a propeller operative therein, an air directing cylinder mounted for movement in the section, means including a control stick whereby the cylinder may be tilted on substantially any diametric line as an axis, elevators, a steering column, connections between the elevators and steering column to operate the elevators simultaneously in the same or opposite directions, and means whereby the control elements for the cylinder may be operated in the movement of the steering column at will.

12. An aeroplane of the helicopter type involving a circular body section, a propeller operative therein, an air directing cylinder mounted for movement in the section, means including a control stick whereby the cylinder may be tilted on substantially any diametric line as an axis, elevators, a steering column, connections between the elevators and steering column to operate the elevators simultaneously in the same or opposite directions, and means operated from the control stick for transmitting the control of the cylinder to the steering column at will.

13. An aeroplane of the helicopter type involving a circular body section, a propeller operative therein, an air directing cylinder mounted for movement in the section, means including a control stick whereby the cylinder may be tilted on substantially any diametric line as an axis, elevators, a steering column, connections between the elevators and steering column to operate the elevators simultaneously in the same or opposite directions, and means operated from the control stick for transmitting the control of the cylinder to the steering column at will, said control stick means providing for restoring the control of the cylinder to the control stick when desired.

14. An aeroplane of the helicopter type including a circular section, a propeller operative within the section, an air controlling cylinder mounted in the section, cables connected to different points on the cylinder to provide an appropriate cable operation for tilting the cylinder on substantially any diametric line as an axis, a control stick to which said cables are connected for operation, elevators, a steering column, cables leading from the elevators to the steering column to provide for controlling said elevators in the movement of the column, and means carried by the cables from the cylinder for locking thereto the cables from the elevators whereby the cylinder and elevators may be controlled from the steering column.

15. An aeroplane of the helicopter type including a circular section, a propeller operative within the section, an air controlling cylinder mounted in the section, cables connected to different points on the cylinder to provide an appropriate cable operation for tilting the cylinder on substantially any diametric line as an axis, a control stick to which said cables are connected for operation, elevators, a steering column, cables leading from the elevators to the steering column to provide for controlling said elevators in the movement of the column, means carried by the cables from the cylinder for locking thereto the cables from the elevators whereby the cylinder and elevators may be controlled from the steering column, and means carried by the control stick for governing said locking means.

In testimony whereof I affix my signature in the presence of two witnesses.

ALEX ANDERSEN.